United States Patent
Huang

(10) Patent No.: US 9,571,749 B2
(45) Date of Patent: Feb. 14, 2017

(54) FLICKER DETECTING METHOD FOR IMAGE CAPTURING DEVICE

(71) Applicant: NOVATEK Microelectronics Corp., Hsin-Chu (TW)

(72) Inventor: Chih-Chih Huang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 14/722,121

(22) Filed: May 26, 2015

(65) Prior Publication Data
US 2016/0352998 A1    Dec. 1, 2016

(51) Int. Cl.
*H04N 5/235* (2006.01)

(52) U.S. Cl.
CPC .................... *H04N 5/2357* (2013.01)

(58) Field of Classification Search
CPC ..................................... H04N 5/2357
USPC ....................................... 348/226.1
See application file for complete search history.

(56) References Cited

U.S. PATENT DOCUMENTS

| | | | | |
|---|---|---|---|---|
| 7,119,853 B1* | 10/2006 | Westerman | ........... | H04N 7/012 348/447 |
| 2003/0030744 A1* | 2/2003 | Baer | ........... | H04N 5/217 348/370 |
| 2003/0052853 A1* | 3/2003 | Wu | ........... | G09G 3/3611 345/90 |
| 2007/0153094 A1* | 7/2007 | Noyes | ........... | H04N 5/235 348/226.1 |
| 2008/0291291 A1* | 11/2008 | Kim | ........... | H04N 5/2351 348/226.1 |
| 2008/0303920 A1* | 12/2008 | Kinoshita | ........... | H04N 5/2353 348/226.1 |
| 2010/0013953 A1* | 1/2010 | Niikura | ........... | H04N 5/2357 348/226.1 |
| 2011/0205394 A1* | 8/2011 | Fuchigami | ........... | H04N 5/243 348/226.1 |
| 2012/0081569 A1* | 4/2012 | Yost | ........... | H04N 5/2353 348/226.1 |
| 2012/0307106 A1* | 12/2012 | Spears | ........... | H04N 5/2357 348/227.1 |
| 2012/0307156 A1* | 12/2012 | Matsuno | ........... | H04N 5/144 348/597 |
| 2013/0242143 A1* | 9/2013 | Chen | ........... | H04N 5/2357 348/241 |
| 2013/0271623 A1* | 10/2013 | Jo | ........... | H04N 5/2357 348/226.1 |
| 2014/0153839 A1* | 6/2014 | Tsuzuki | ........... | H04N 5/2355 382/254 |
| 2015/0116537 A1* | 4/2015 | Ariga | ........... | H04N 5/2353 348/226.1 |

(Continued)

*Primary Examiner* — Roberto Velez
*Assistant Examiner* — Cynthia Segura
(74) *Attorney, Agent, or Firm* — Winston Hsu; Scott Margo

(57) ABSTRACT

A flicker detecting method for an image capturing device includes acquiring a first image, wherein pixel values of each row in the first image are acquired during a first period; acquiring a second image, wherein pixel values of each row in the second image are acquired during a second period; generating a third image according to the first image and the second image; and detecting flickers according to the third image; wherein the first period is different from the second period.

2 Claims, 6 Drawing Sheets

(56) References Cited

U.S. PATENT DOCUMENTS

2015/0229824 A1* 8/2015 Tanaka .................. H04N 5/217
  348/228.1
2015/0312464 A1* 10/2015 Peng .................... H04N 5/2357
  348/226.1

* cited by examiner

FLICKER DETECTING METHOD FOR IMAGE CAPTURING DEVICE

BACKGROUND OF THE INVENTION

1. Field of the Invention

The present invention relates to a flicker detecting method for an image capturing device, and more particularly, to a flicker detecting method capable of detecting flickers in an image without being interfered by the image contents.

2. Description of the Prior Art

With advances of digital camera modules, almost all the electronic devices such as cell phones, tablets and personal digital assistants are now equipped with image capturing functions. When the electronic device captures images or videos under a fluorescent lamp, the flickers may exist in the captured images or videos due to the effects of alternating current provided to the fluorescent lamp.

Generally, the flickers in the images are detected via determining whether flicker patterns exist in the images. However, the searching of flicker patterns is easy to be interfered by the image contents. The accuracy of detecting the flicker is therefore downgraded. Thus, how to detect the flickers with a high accuracy becomes a topic to be discussed.

SUMMARY OF THE INVENTION

In order to solve the above problem, the present invention provides a flicker detecting method capable of detecting flickers in an image without being affected by the image contents.

In an aspect, a flicker detecting method for an image capturing device is disclosed. The flicker detecting method comprises acquiring a first image, wherein pixel values of each row in the first image are acquired during a first period; acquiring a second image, wherein pixel values of each row in the second image are acquired during a second period; generating a third image according to the first image and the second image; and detecting flickers according to the third image; wherein the first period is different from the second period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
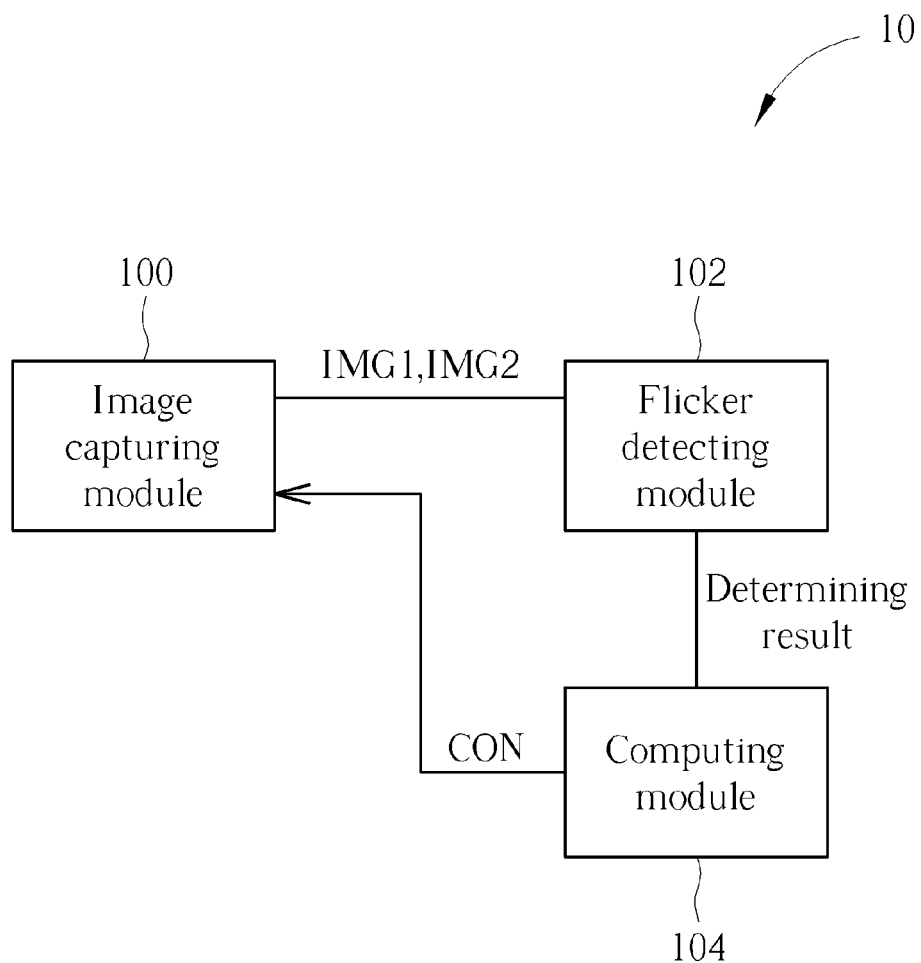
FIG. 1 is a schematic diagram of an image capturing device according to an example of the present invention.

Please refer to FIG. 1, which is a schematic diagram of an image capturing device 10 according to an example of the present invention. The image capturing device 10 may be an electronic product with an image capturing function and/or a video recording function, such as a webcam, a digital camera, a smart phone, a tablet a surveillance camera. As shown in FIG. 1, the image capturing device 10 comprises an image capturing module 100, a flicker detecting module 102 and a computing module 104. Note that, components which are not directly related to the present invention (e.g. a panel, a lens and a housing) are not shown in FIG. 1 for brevity. The image capturing module 100 is utilized for capturing images IMG1 and IMG2. The flicker detecting module 102 is coupled to the image capturing module 100 and is utilized for determining whether the images acquired by the capturing module 100 possibly include flickers according to the images IMG1 and IMG2. Based on the determining results of the flicker detecting module 102, the computing module 104 compensates the flicker in the image acquired by the image capturing module 100 and/or adjusts the image capturing module 100 for avoiding the flicker being generated in the captured image via a control signal CON.

In details, the pixel values (e.g. the luminance) of the pixels in the images IMG1 and IMG2 are sensed row by row, wherein the period of sensing pixel values of each row in the image IMG1 is a period P1 and the period of sensing pixel values of each row in the image IMG2 is a period P2, wherein the period P1 is different from the period P2. For example, the period P1 may be a multiple of half of an alternating current period PAC of the alternating current satisfied the international standard and the period P2 is may not be the multiple of half of the alternating current period PAC. In this example, the frequency of the alternating current in the international standards may be 50 Hz or 60 Hz, thus the alternating current period PAC is one of $$\frac{1}{50}$$

seconds and $$\frac{1}{60}$$

seconds, the period P1 is the multiple of one of $$\frac{1}{100}$$

seconds and $$\frac{1}{120}$$

seconds, and the period P2 is not the multiple of $$\frac{1}{100}$$

seconds or $$\frac{1}{120}$$

seconds. Since the period P1 of sensing the pixel value of each row in the image IMG1 is equaled to the multiple of half of the alternating current period PAC, the image IMG1 would not include the flickers even if the image capturing device 10 is under a light (e.g. a fluorescent lamp) powered by the alternating current. On the other hand, since the period P2 of sensing each row of pixels in the image IMG2 is not equaled to the multiple of half of the alternating current period PAC, the image IMG2 may include the flickers based on whether the image capturing device 10 is under the light powered by the alternating current.

According to the pixel values (e.g. the luminance) of the images IMG1 and IMG2, the flicker detecting module 102 detects whether the image captured by the image capturing module 100 possibly includes flickers (e.g. whether the image capturing device 10 is under the light powered by the alternating current). In an example, the flicker detecting module 102 divides each pixel value of the image IMG2 by that at the corresponded position in the image IMG1, to generate an image IMG3 (i.e. IMG3=IMG2/IMG1). Assuming the image contents in the image IMG1 and those in the image IMG2 are the same, the effect of the image contents can be eliminated via dividing the image IMG2 by the image IMG1. In such a condition, the pixel values in the image IMG3 would be the same and be proportional to a ratio between the periods P2 and P1 (i.e. there are not flickers in IMG3) when the image IMG2 does not include the flickers; and the image IMG3 would include the flickers if the image IMG2 has the flickers. Via detecting whether the image IMG3 includes the flickers, the flicker detecting module 102 accurately determines whether the image captured by the image capturing module 100 possibly includes the flickers without interfering by the image contents in the images IMG1 and IMG2.

Note that, the method of the flicker detecting module 102 detecting whether the image IMG3 has the flickers may be various. For example, the flicker detecting module 102 may gather the statics of the pixel values at each row in the image IMG3 and search the local minimums among the statics. When there is a specific interval between the local minimums, the flicker detecting module 102 determines the image IMG3 includes the flickers. The method of the flicker detecting module 102 detecting whether the image IMG3 has the flickers can be appropriately modified according to different application and design concepts, and is not limited herein. For example, the flicker detecting module 102 may scale down the image IMG3 before gathering the statics of the pixel values at each row in the image IMG3, to reduce the computing cost.

Figure 2:
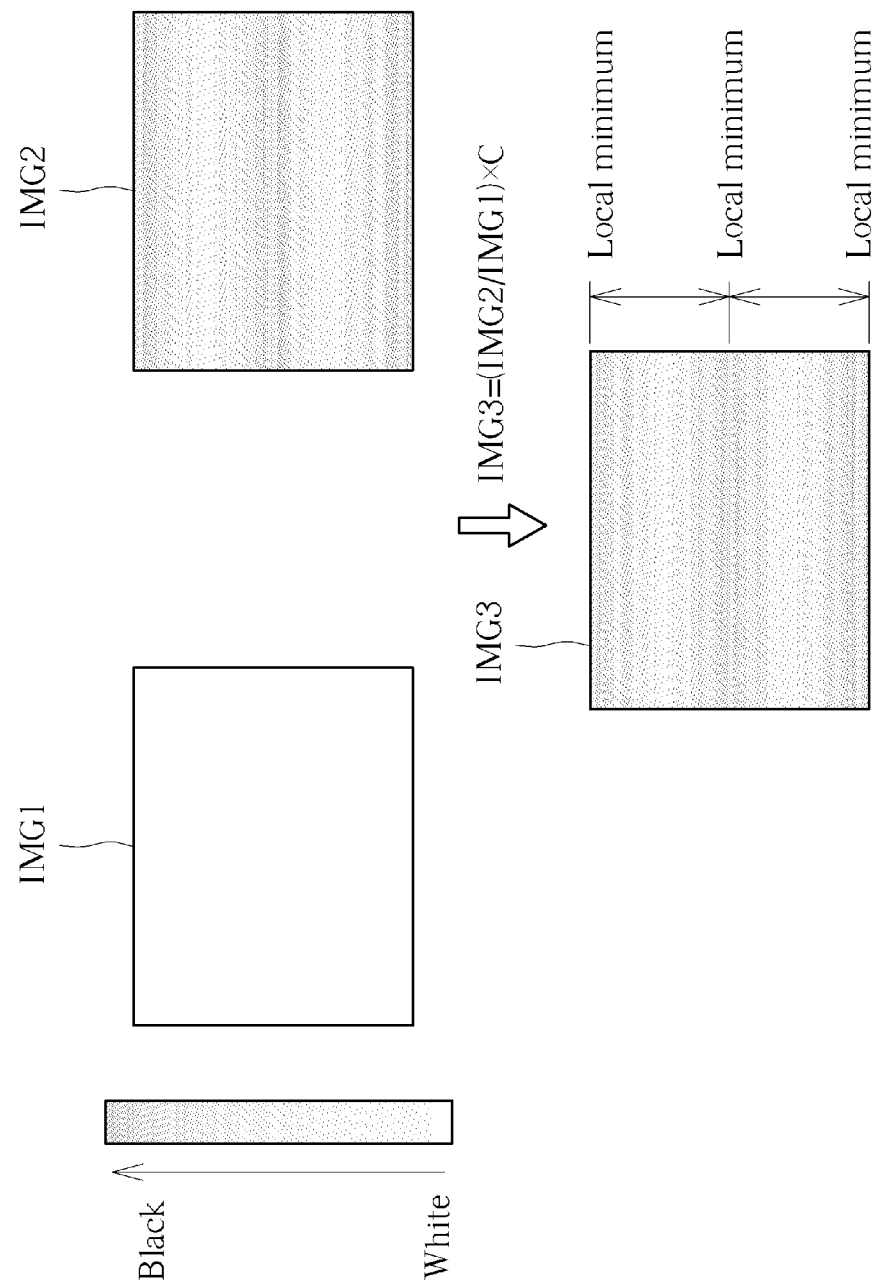
FIG. 2 is a schematic diagram of images captured by the image capturing device according to an example of the present invention.

Please refer to FIG. 2, which is a schematic diagram of images IMG1-IMG3 according to an example of the present invention. In this example, the image capturing module 100 captures white screen according to the periods P1 and P2, respectively, to acquire the images IMG1 and IMG2, wherein the period P1 is $$\frac{1}{100}$$

seconds and the period P2 is $$\frac{0.5}{100}$$

seconds. Since the period P1 is greater than the period P2, the image IMG1 is brighter than the image IMG2 in FIG. 2. In addition, the image capturing device 10 is under the light powered by the alternating current, the frequency of which is 50 Hz (i.e. the alternating current period PAC is $$\frac{1}{50}$$

seconds). Under such a condition, the image IMG1 does not have the flickers since the period P1 is equaled to the multiple of half of the alternating current period PAC and the image IMG2 has the flickers since the period P2 is not equaled to the multiple of half of the alternating current period PAC. The image IMG3 is acquired via dividing each pixel value of the image IMG2 by the pixel value at the corresponded position in the image IMG1. In order to adjust the scale of the pixel values in the image IMG3 to be the same with those of the pixel values in the images IMG1 and IMG2, the pixel values in the image IMG3 is multiplied by a constant C related to the range of the pixel values in the image images IMG1 and IMG2. For example, the constant C is 256 when the range of the pixel values in the images IMG1 and IMG2 is 0-255. Since there are specific intervals between the local minimums of horizontal rows in the image IMG3, the flicker detecting module 102 determines that the image captured by the image capturing module 100 possibly includes the flickers and the computing module 104 compensates the flicker in the image acquired by the image capturing module 100 and/or adjusts the image capturing module 100 for avoiding the flicker being generated in the captured image according to the determining results of the flicker detecting module 102.

Figure 3:
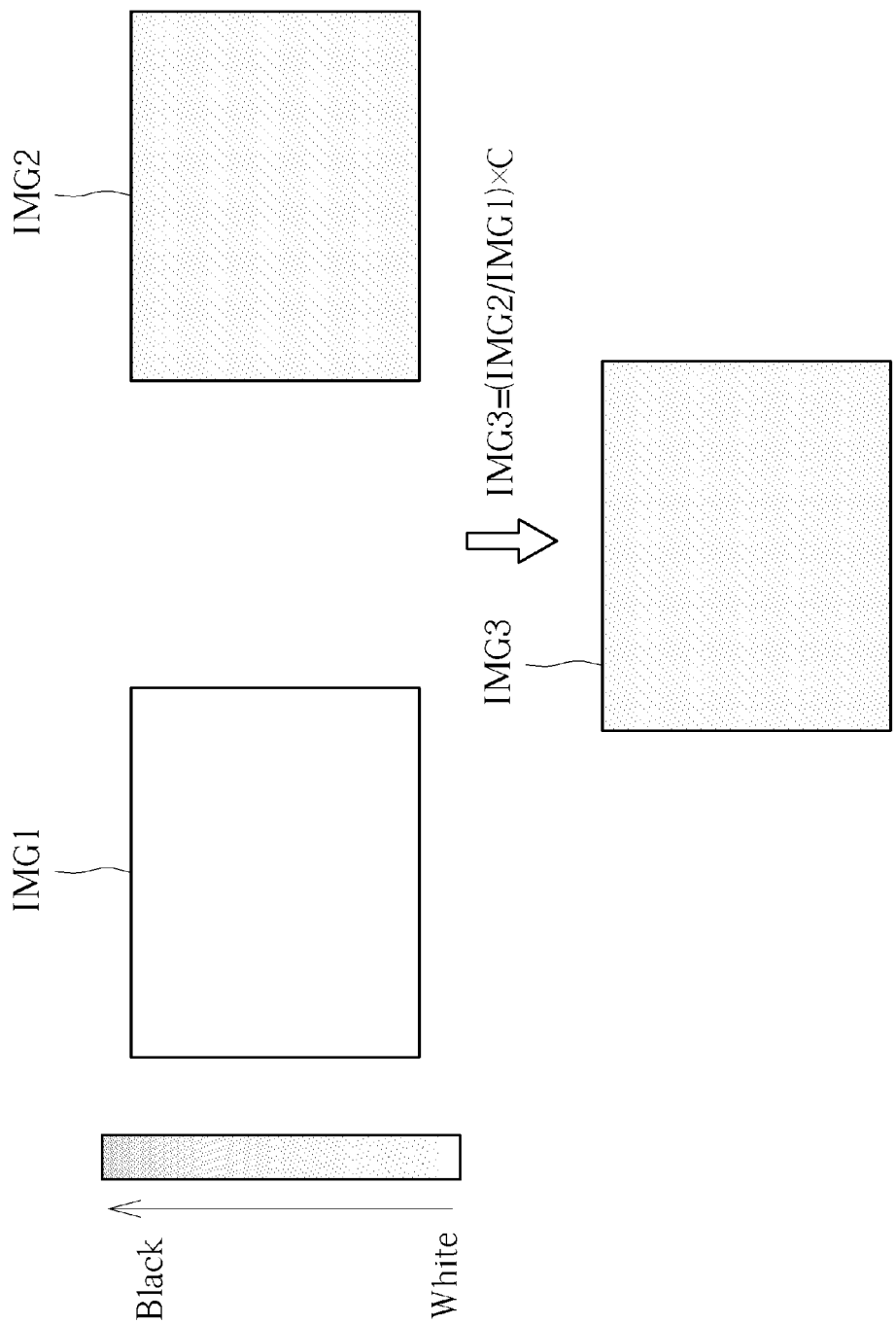
FIG. 3 is a schematic diagram of images captured by the image capturing device according to an example of the present invention.

Please refer to FIG. 3, which is a schematic diagram of images IMG1-IMG3 according to an example of the present invention. Similar to FIG. 2, the image capturing module 100 captures white screen according to the periods P1 and P2, respectively, to acquire the images IMG1 and IMG2, wherein the period P1 is $$\frac{1}{100}$$

seconds and the period P2 is $$\frac{0.5}{100}$$

seconds. Since the period P1 is greater than the period P2, the image IMG1 is brighter than the image IMG2 in FIG. 2. In addition, the image capturing device 10 is not under the light powered by the alternating current. In such a condition, both the images IMG1 and IMG2 do not have the flickers. The image IMG3 is acquired by dividing each pixel value of the image IMG2 by the pixel value at the corresponded position in the image IMG1 and multiplying the pixel values by the constant C. Since the pixel values in the image IMG3 are all the same (i.e. no flicker in the image IMG3), the flicker detecting module 102 determines that the image captured by the image capturing module 100 does not possibly include the flickers.

Figure 4:
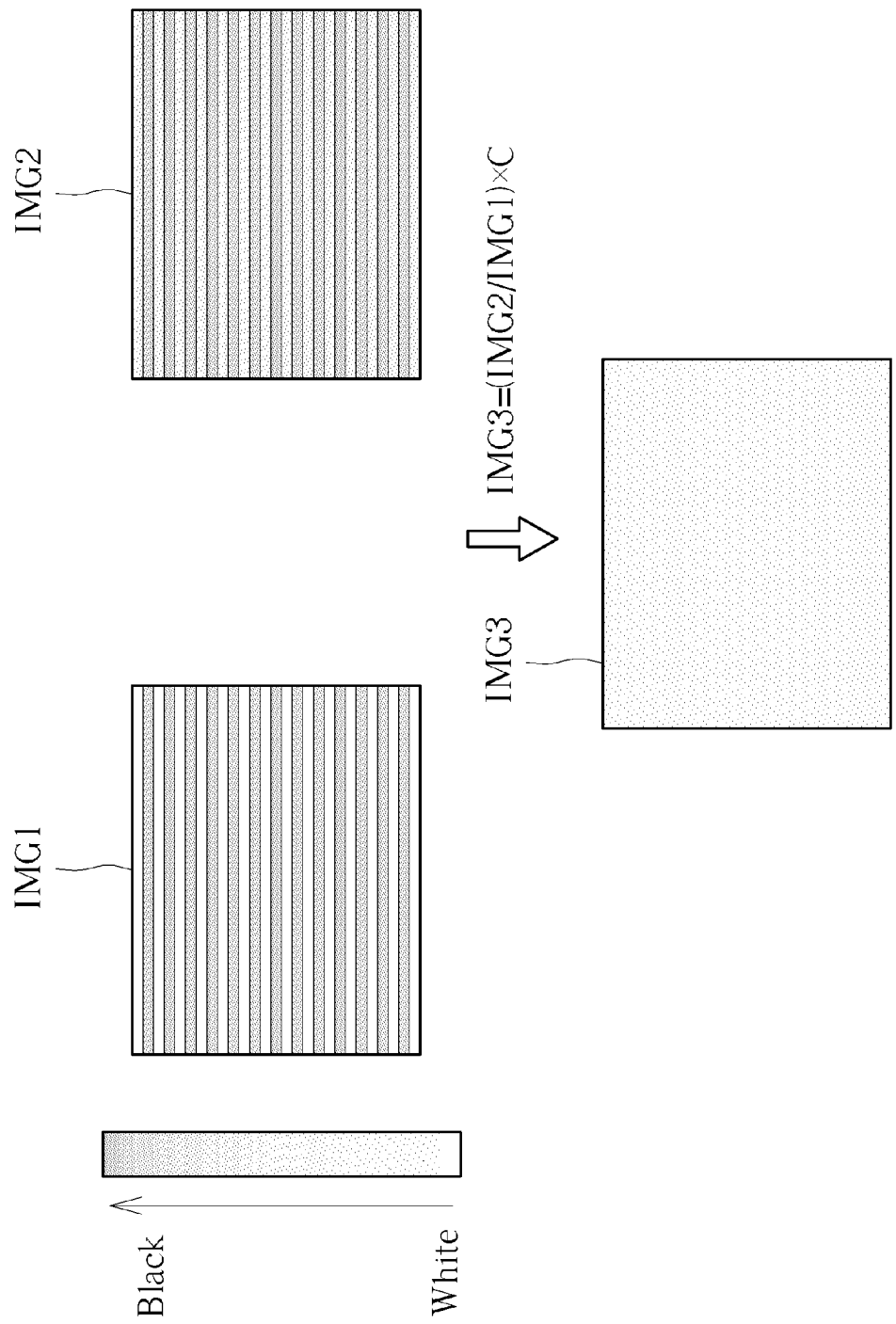
FIG. 4 is a schematic diagram of images captured by the image capturing device according to an example of the present invention.

Please refer to FIG. 4, which is a schematic diagram of images IMG1-IMG3 according to an example of the present invention. In this example, the image capturing module 100 captures black and white stripes according to the periods P1 and P2, respectively, to acquire the images IMG1 and IMG2, wherein the period P1 is $$\frac{1}{100}$$

seconds and the period P2 is $$\frac{0.5}{100}$$

seconds. The image IMG1 is brighter than the image IMG2 in FIG. 4 since the period P1 is greater than the period P2. In this example, the image capturing device 10 is not under the light powered by the alternating current in FIG. 3. Under such a condition, both the images IMG1 and IMG2 do not have the flickers. Via dividing each pixel value of the image IMG2 by the pixel value in the corresponded position in the image IMG1 and multiplying the pixel values by the constant C, the image IMG3 without the flickers can be acquired, wherein the pixel values in the image IMG3 is proportional to the ratio ½ between the periods P2 and P1. Since there is no flicker in the image IMG3, the flicker detecting module 102 determines that the image captured by the image capturing module 100 would not have the flickers.

Note that, if the flicker detecting module 102 determines whether the image captured by the image capturing module 100 possibly includes the flickers according to the image IMG1 or IMG2 shown in FIG. 4, the flicker detecting module 102 would acquire erroneous results due to the black and white stripes. Instead of utilizing single image, the flicker detecting module 102 of the present invention utilizes the image IMG3 generated according to the images IMG1 and IMG2, the periods of sensing pixel values at each row of which are different, as the determining basis, so as to eliminate the effects of the image contents. As a result, the flicker detecting module 102 accurately determines whether the image captured by the image capturing module 100 possibly includes the flickers without interfering by the image contents.

Figure 5:
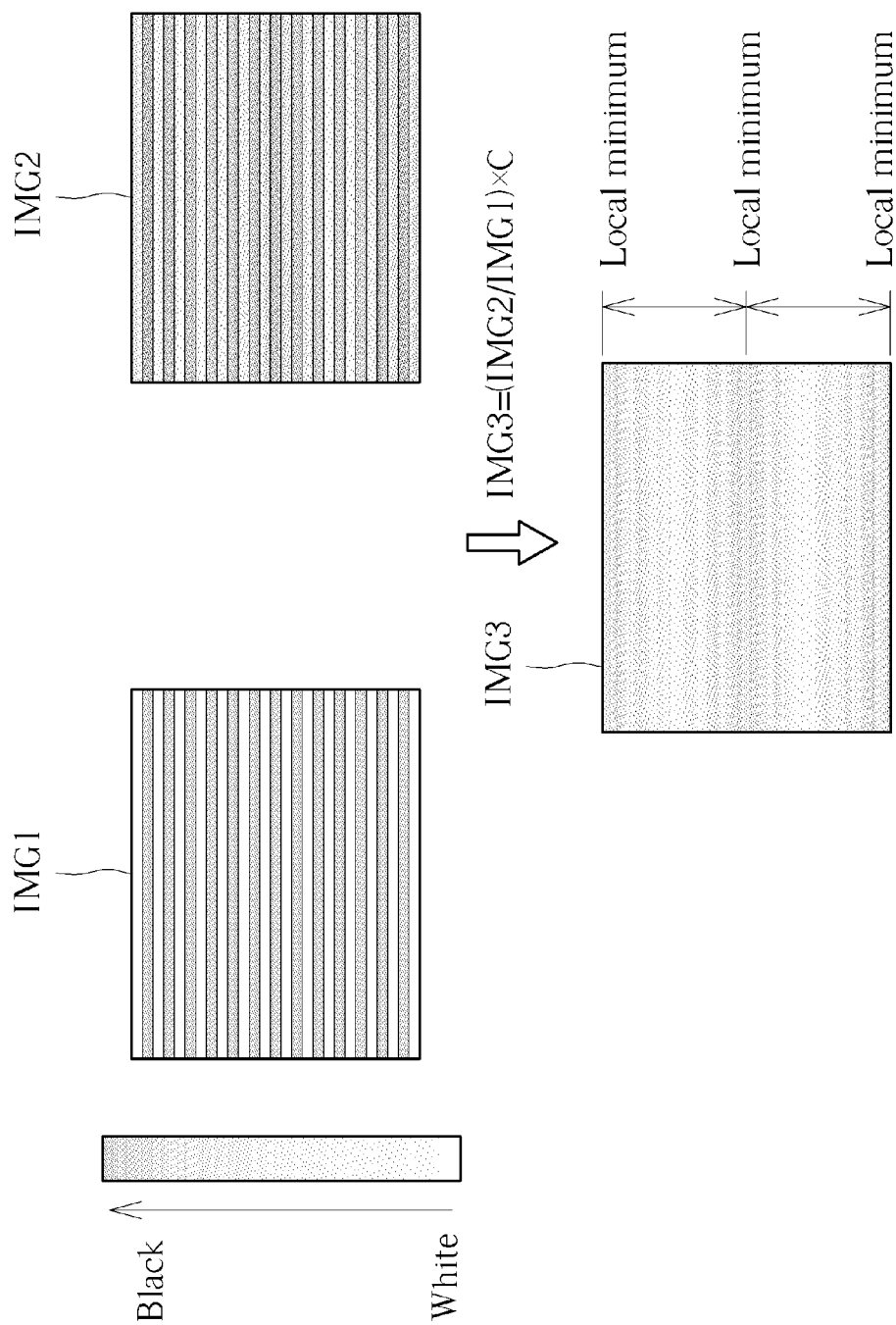
FIG. 5 is a schematic diagram of images captured by the image capturing device according to an example of the present invention.

Please refer to FIG. 5, which is a schematic diagram of images IMG1-IMG3 according to an example of the present invention. Similarly to FIG. 4, the image capturing module 100 captures black and white stripes according to the periods P1 and P2, respectively, to acquire the images IMG1 and IMG2, wherein the period P1 is $$\frac{1}{100}$$

seconds and the period P2 is $$\frac{0.5}{100}$$

seconds. The image IMG1 is brighter than the image IMG2 in FIG. 5 since the period P1 is greater than the period P2. Different from FIG. 4, the image capturing device 10 is under the light powered by the alternating current in FIG. 3. Thus, the image IMG1 does not have the flickers since the period P1 is equaled to the multiple of half of the alternating current period PAC and the image IMG2 has the flickers since the period P2 is not equaled to the multiple of half of the alternating current period PAC. Via dividing each pixel value of the image IMG2 by the pixel value in the corresponded position in the image IMG1 and multiplying the pixel values by the constant C, the image IMG3 having the flickers can be acquired. Since there is no flicker in the image IMG3, the flicker detecting module 102 determines that the image captured by the image capturing module 100 would not have the flickers. On the basis of the specific intervals between the local minimums of horizontal rows in the image IMG3, the flicker detecting module 102 determines that the image captured by the image capturing module 100 possibly includes the flickers and the computing module 104 compensates the flicker in the image acquired by the image capturing module 100 and/or adjusts the image capturing module 100 for avoiding the flicker is generated in the captured image.

The above example determines whether the captured image possibly includes the flickers according to the images sensed by different row periods. Under such a condition, the accurate flicker detecting results can be acquired without being interfered by the image contents. According to different application and design concepts, those with ordinary skill in the art may observe appropriate alternations and modifications. For example, the flicker detecting module 102 may acquire the image IMG3 by dividing each pixel value in the image IMG1 by the pixel value at the corresponded position in the image IMG2 (i.e. IMG3=IMG1/IMG2).

In addition, the periods P1 and P2 can be set to be any values and are not limited to the above examples. Since the image IMG3 is generated according to the images IMG1 and IMG2, the flicker would be expected to exist in the image IMG3 if and only if the image capturing module 100 is under the light source powered by the alternating current. In other words, the flicker detecting module 102 can detect whether the image captured by the image capturing module 100 possibly includes flickers as long as the period P1 is different from the period P2.

In an example, the flicker detecting module 102 may acquire the image IMG3 by calculating sums of each pixel value in the image IMG2 and the pixel value at the corresponded position in the image IMG1 and dividing each pixel value in the image IMG2 by the corresponded sum (i.e. IMG3=IMG2/(IMG1+IMG2)). In this way, the effects generated by mismatches of the image contents in the images IMG1 and IMG2 can be reduced.

In another example, the flicker detecting module 102 may exclude the excessively high pixel values and the extremely low pixel values in the images IMG1 and IMG2 when generating the image IMG3, to eliminate the pixel values which are not suitable for detecting the flickers. For example, when dividing a pixel value PVA of the image IMG2 by a pixel value PVB at the corresponded position in the image IMG1 to generate a pixel value PVC of the image IMG3, the flicker detecting module 102 sets the pixel value PVC to 0 if the minimum of the pixel values PVA and PVB is smaller than a threshold TH1, the maximum of the pixel values PVA and PVB is greater than a threshold TH2, the quotient of the pixel values PVA and PVB (i.e. the pixel value PVC) is smaller than a threshold TH3, or the quotient of the pixel values PVA and PVB is greater than a threshold TH4. The equation of the flicker detecting module 102 generating the pixel value PVC of the image IMG3 can be expressed as the followings:

$$PVC = \begin{cases} \frac{PVA}{PVB}, & \text{if } \min(PVA, PVB) > TH1 \text{ \&\& } \max(PVA, PV) < TH2 \text{ \&\& } TH3 < \left(\frac{PVA}{PVB}\right) < TH4 \\ 0, & \text{else} \end{cases}$$

In still another example, the image capturing module 100 further acquires an image IMG4 after sequentially acquiring the images IMG1 and IMG2. Next, the flicker detecting module 102 generates the image IMG3 via calculating sums of each pixel value in the image IMG1 and the pixel value at the corresponded position in the image IMG4 and dividing each pixel value in the image IMG2 by the corresponded sum (i.e. IMG3=IMG2/(IMG1+IMG4)). The effects generated by mismatches of the image contents in the images IMG1 and IMG2 can be reduced in this example.

Figure 6:
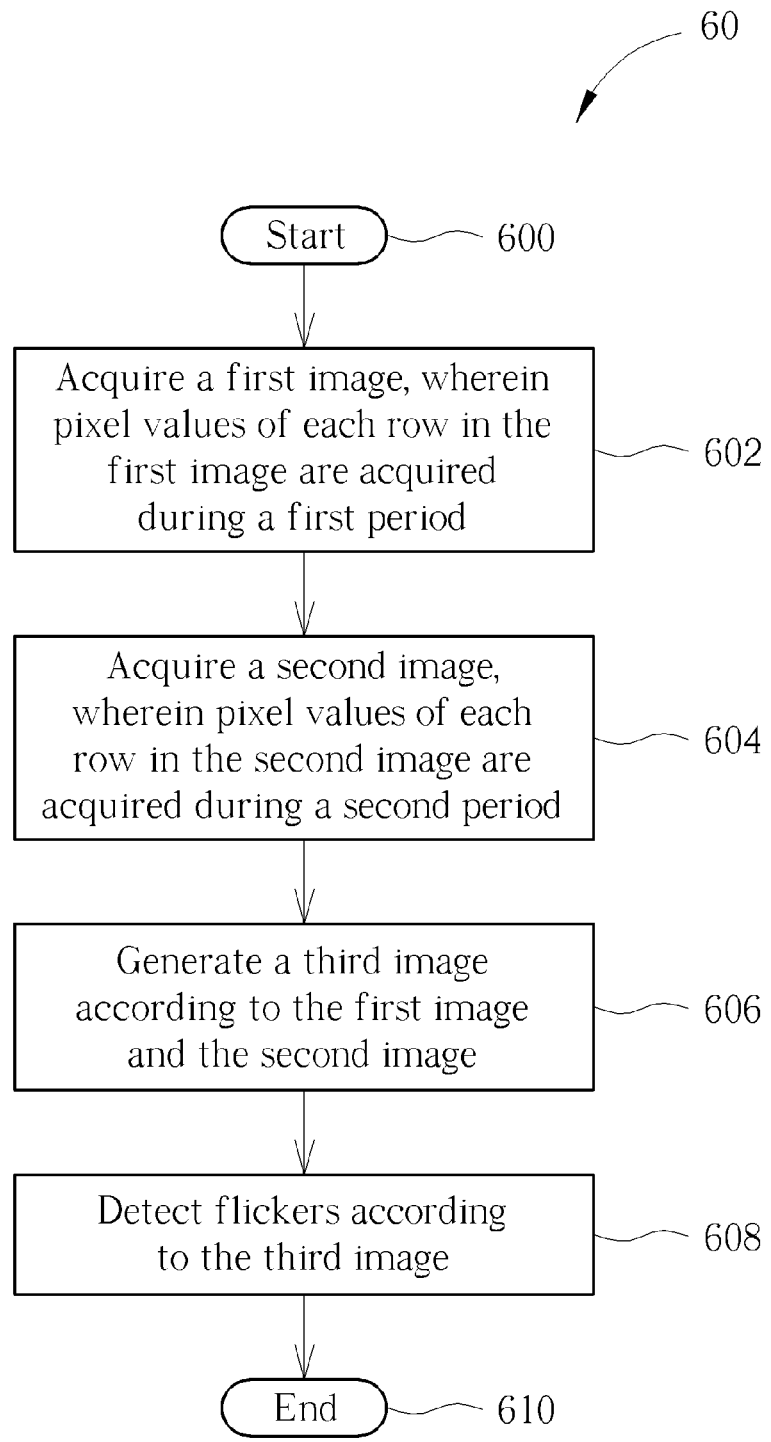
FIG. 6 is a flowchart of a flicker detecting method according to an example of the present invention.

The procedure of the flicker detecting module 102 determining whether the image captured by the image capturing module 100 possibly includes the flickers can be summarized into a flicker detecting method 60 shown in FIG. 6. The flicker detecting method 60 may be utilized in an image capturing device such as an electronic product with the image capturing function or the video recording function (e.g. a webcam, a digital camera, a smart phone, a tablet a surveillance camera) and comprises the following steps:

Step 600: Start.

Step 602: Acquire a first image, wherein pixel values of each row in the first image are acquired during a first period.

Step 604: Acquire a second image, wherein pixel values of each row in the second image are acquired during a second period.

Step 606: Generate a third image according to the first image and the second image.

Step 608: Detect flickers according to the third image.

Step 610: End.

According to the flicker detecting method 60, the image capturing device sequentially acquires a first image and a second image, wherein pixel values of each row in the first image are acquired during a first period and pixel values of each row in the second image are acquired during a second period. Note that, the first period is different from the second period. For example, the first period is a multiple of half of an alternating current period and the second period is not the multiple of half of the alternating current period. In an example, the alternating current period is one of $$\frac{1}{50}$$

seconds and $$\frac{1}{60}$$

seconds. Next, the image capturing device generates a third image according to the first image and the second image, to eliminate the effect of the image contents in the first image and the second image. Based on whether the third image includes flickers, the image capturing device determines whether the captured image possibly has flickers. According to the determined results, the image capturing device therefore can perform operations for compensating the captured image and/or avoiding the flickers is generated in the captured image. The details of the flicker detecting method 60 can be referred to the above example, and are not narrated herein for brevity.

Note that, the image capturing device may perform the flicker detecting method 60 multiple times for different alternating current periods. In an example, the first period is a multiple of half of an alternating current period and the second period is not the multiple of half of the alternating current period. The image capturing device first sets the alternating current period to be $$\frac{1}{50}$$

seconds and performs the flicker detecting method 60. Next, the image capturing device sets the alternating current period to be $$\frac{1}{60}$$

seconds and perform the flicker detecting method 60 again.

Please note that, the above mentioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits such as microcircuits, microchips, or silicon chips. Examples of the electronic system can include system on chip (SOC), system in package (Sip), computer on module (COM), and the image capturing device 10.

To sum up, the image capturing device of the above examples determines whether the captured image possibly includes flickers according to the images sensed by different row periods. As a result, the flickers in the captured image can be accurately detected without being interfered by the image contents.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A flicker detecting method for an image capturing device, the flicker detecting method comprising:
- acquiring, by a processing module of the image capturing device, a first image, wherein pixel values of each row in the first image are acquired during a first period;
- acquiring, by the processing module of the image capturing device, a second image, wherein pixel values of each row in the second image are acquired during a second period;
- acquiring, by the processing module of the image capturing device, a fourth image after sequentially acquiring the first image and the second image, wherein pixel values of each row in the fourth image is acquired during the first period;
- generating, by the processing module of the image capturing device, a third image according to the first image, the second image and the fourth image;
- detecting, by the processing module of the image capturing device, flickers according to the third image; and
- compensating, by the processing module of the image capturing device, flickers in a fifth image when capturing the fifth image if the flickers of the third image is detected;
- wherein the first period is different from the second period;
- wherein the step of generating the third image according to the first image, the second image and the fourth image comprises:
  - calculating sums of each pixel value in the first image and pixel value at the corresponded position in the fourth image; and
  - dividing each pixel value in the second image by the corresponded sum, to generate the third image.

2. The flicker detecting method of claim 1, wherein the first period is a multiple of half of an alternating current period, the second period is not the multiple of half of the alternating current period and the alternating current period is one of $$\frac{1}{50}$$

seconds and $$\frac{1}{60}$$

seconds.

* * * * *